US006731428B2

(12) United States Patent
Gehlot

(10) Patent No.: US 6,731,428 B2
(45) Date of Patent: May 4, 2004

(54) PUMP MONITORING AND CONTROL IN A FIBER RAMAN AMPLIFIER

(75) Inventor: Narayan L. Gehlot, Sayreville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/990,231

(22) Filed: Nov. 21, 2001

(65) Prior Publication Data

US 2003/0095322 A1 May 22, 2003

(51) Int. Cl.⁷ .............................................. H01S 3/108
(52) U.S. Cl. ................ 359/359; 359/341.3; 359/341.33
(58) Field of Search ............................. 359/334, 341.3, 359/341.33, 110, 189; 385/1–2, 4, 8

(56) References Cited

U.S. PATENT DOCUMENTS

| | | | | |
|---|---|---|---|---|
| 5,208,817 A | * | 5/1993 | Kao et al. ...................... 372/26 |
| 5,285,306 A | * | 2/1994 | Heidemann ................. 359/160 |
| 5,383,046 A | * | 1/1995 | Tomofuji et al. ........... 359/176 |
| 5,436,750 A | * | 7/1995 | Kawano ..................... 359/177 |
| 5,475,385 A | * | 12/1995 | Pettitt et al. ........... 340/870.09 |
| 5,668,658 A | * | 9/1997 | Hamada ................. 359/341.43 |
| 5,777,764 A | * | 7/1998 | Kohn ......................... 359/133 |
| 5,801,877 A | * | 9/1998 | Yoneyama ............... 359/341.1 |
| 6,122,298 A | | 9/2000 | Kerfoot, III et al. ............ 372/6 |
| 6,147,794 A | | 11/2000 | Stentz ........................ 359/334 |
| 6,178,025 B1 | * | 1/2001 | Hardcastle et al. .......... 359/177 |
| 6,191,877 B1 | | 2/2001 | Chraplyvy et al. ......... 359/124 |
| 6,282,002 B1 | | 8/2001 | Grubb et al. ................ 359/160 |
| 6,356,383 B1 | * | 3/2002 | Cornwell et al. ........... 359/334 |
| 6,452,716 B1 | * | 9/2002 | Park et al. ................... 359/334 |
| 6,456,426 B1 | * | 9/2002 | Bolshtyansky et al. ...... 359/334 |
| 2002/0044324 A1 | * | 4/2002 | Hoshida et al. ............. 359/179 |
| 2002/0114061 A1 | * | 8/2002 | Naito et al. ................. 359/334 |

OTHER PUBLICATIONS

Buckland et al. "Measurement of the frequency response of the elctrostrictive nonlinearity in optical fibers" May 15, 1997, Optics Letters. vol. 22, No. 10, pp. 676–678.*

* cited by examiner

Primary Examiner—Thomas G. Black
Assistant Examiner—Stephen Cunningham

(57) ABSTRACT

An arrangement for monitoring the performance of each pump source in a fiber Raman amplifier arrangement utilizes a set of unique "signature" signals, each signature signal impressed on a different pump input signal. At the receiver, the signature signals are extracted from the received, amplified signal. If a particular signature signal is missing at the receiver, this is indicative of failure of its associated pump source at the transmitter. If a particular signature signal is noticeable weaker than other received signature signals (as evidenced by, for example a low SNR or high BER), this is indicative of a power loss in its associated pump source. Since each signature signal is chosen to be unique, the identity of each pump source can be easily ascertained. In one embodiment, a low data rate signal is impressed on an RF signal used to modulate the pump prior to be applied to the transmission fiber. Alternatively, the RF modulation signal associated with each pump source can be offset by a predetermined frequency and the frequency offset used as the signature.

17 Claims, 2 Drawing Sheets

PUMP MONITORING AND CONTROL IN A FIBER RAMAN AMPLIFIER

TECHNICAL FIELD

The present invention relates to fiber Raman amplifiers and, more particularly, to the use of monitoring information on an applied Raman pump signal to analyze the performance of the amplifier.

BACKGROUND OF THE INVENTION

Optical amplification by stimulated Raman scattering in a single mode fiber is of interest for applications in optical communication systems. In particular, the use of Raman amplification in wavelength division multiplexed (WDM) optical communication systems is particularly attractive, since the bandwidth of the Raman amplifier can be large enough to accommodate two or more WDM channels. The performance of intensity-modulated WDM systems using Raman amplifiers, however, may be limited by the cross talk between the information channels and the amount of power actually coupled from the Raman pump into the information channels (as well as fiber nonlinearity-related penalties).

The cross talk in Raman amplifiers is mediated by the pump source. That is, each modulated channel causes pattern-dependent pump depletion that is subsequently superimposed on all other channels during the amplification process. The cross talk has been found to be dependent on the modulation frequency of the channels, as well as the relative speed between the channels and the pump. For this reason, the amount of cross talk present in co- and counter-propagating pump configurations has been found to differ significantly.

Regarding the issue of pattern dependence, if one channel is transmitting a long stream of "1 's" or "0's", the power in the adjacent channel will change. Thus, optical amplifiers would perform best in situations where the data pattern is random. The pattern-dependence problem, which leads to "power stealing" between channels has been addressed in co-pending application Ser. No. 09/990,206, also filed by the applicant on Nov. 21, 2001, which discloses the use of a radio frequency (RF) modulation signal impressed on a conventional continuous wave (CW) pump signal. In our co-pending application, the modulation frequency and depth are controlled to introduce a slight fluctuation to the input power level of the pump signal, resulting in introducing a sufficient degree of randomness to overcome the cross talk problem, and increase the amount of power coupled from the Raman pump into the information-bearing signals. Modifying the modulation index of the RF signal applied to the pump has been found to control any non-linearities present in the amplified output signal.

While this arrangement is helpful, a need remains to monitor the performance of the fiber Raman amplifier system. Existing methods in the prior art may use a separate communication channel as a "monitoring" channel, observing and analyzing a transmitted monitoring signal at a receiver. Although useful, this method decreases the efficiency of the system by requiring the dedication of a channel to the monitoring process. Another method utilizes "monitoring tones" impressed on a transmitted data signal. This method results in introducing a penalty in terms of the recovered information from this data signal.

Thus, a need remains in the art for an arrangement which can monitor the performance of a fiber Raman amplifier without incurring penalties on the transmitted data signals.

SUMMARY OF THE INVENTION

The need remaining in the art is addressed by the present invention, which relates to fiber Raman amplifiers and, more particularly, to the use of monitoring information on an applied pump signal to analyze the performance of the amplifier.

In accordance with the present invention, the RF signal used to modulate the pump is itself modulated with a low data rate "signature" signal, chosen to be unique for that particular pump. At the receiver end, a filter and demodulator are used to separate the pump from the amplified information signal and recover the unique signature signal. Problems with a given pump source can be presumed, therefore, if its associated, recovered unique signature signal is absent, exhibits a low signal-to-noise ratio (SNR), or an excessive bit error rate (BER). In systems which utilize multiple pump sources, the use of a unique signature signal for each pump source allows for the receiver to distinguish between the pumps and monitor each source.

In an alternative embodiment of the present invention, the unique signature may comprise a frequency offset applied to the RF modulation signal at the pump source, where this offset is then be used at the receiver to identify each separate pump source. Once detected, an appropriate mechanism can be utilized to correct the defective pump source (e.g., replace optic device, increase power, etc.).

BRIEF DESCRIPTION OF THE DRAWINGS

Referring now to the drawings.

DETAILED DESCRIPTION

Figure 1:
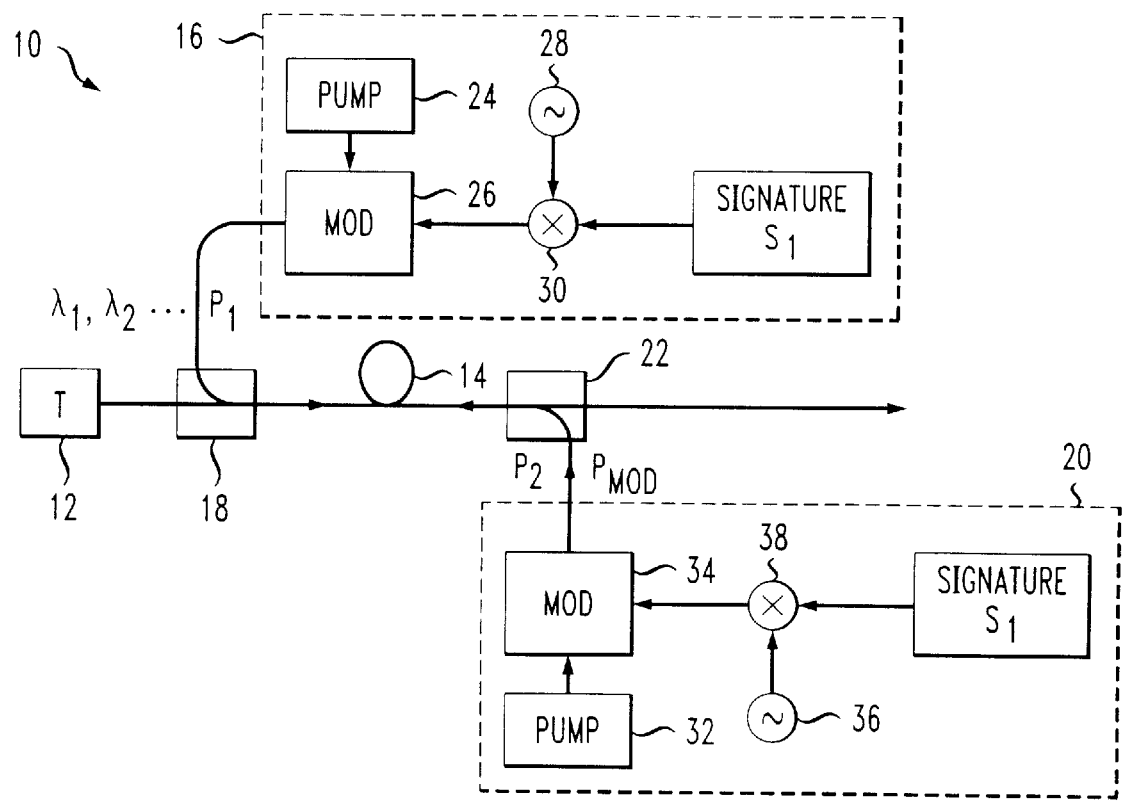
FIG. 1 illustrates an exemplary optical transmitter including a fiber Raman amplifier and utilizing a pair of pump sources including a monitoring arrangement formed in accordance with the present invention.

An exemplary WDM optical communication system 10, utilizing fiber Raman amplification in accordance with the principles of the present invention, is illustrated in FIG. 1. As shown, a transmitter 12 is included and used to provide a plurality of N optical input signals, each occupying a different channel and operating at a different wavelength, denoted $\lambda_1 - \lambda_N$ in FIG. 1. It is to be understood that transmitter 12 may comprise, in fact, a plurality of separate transmitting sources (i.e., lasers), and include a wavelength division multiplexer (WDM) and/or other suitable devices, used to combine all of the optical input signals onto a single optical transmission fiber 14. In an exemplary system that utilizes fiber Raman amplification, the plurality of input signals may utilize wavelengths in the range of, for example, 1520 nm to 1620 nm.

In the arrangement as shown in FIG. 1, both a co-propagating pump signal, denoted $P_1$, and a counter-propagating pump signal, denoted $P_2$, are used to provide amplification of the input signals along transmission fiber 14. A first pump source 16 is used to generate pump signal $P_1$ and a first wavelength division multiplexer 18 is used couple Raman pump signal $P_1$ (as a co-propagating pump signal) onto transmission fiber 14. In a similar fashion, a second pump source 20 is used to generate pump signal $P_2$ and a second wavelength division multiplexer 22 is used to couple Raman pump signal $P_2$ (as a counter-propagating pump signal) onto transmission fiber 14.

Figure 2:
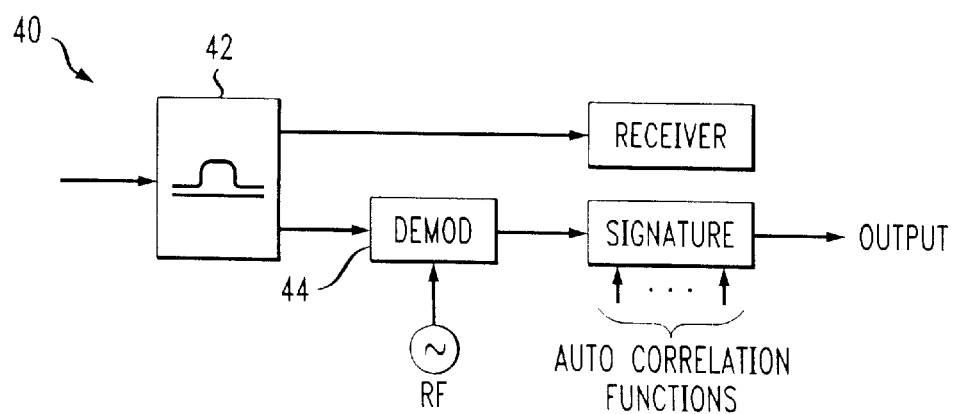
FIG. 2 is an exemplary optical receiver for recovering the pump monitoring signal utilized in the arrangement of FIG. 1.

In accordance with the present invention, a unique pump signature is impressed on each pump signal, where the signature signal will thereafter propagate through the transmission system and can later be captured by an optical receiver (as shown in FIG. 2), and used to monitor and control the various pump sources at an optical transmitter. Referring in particular to FIG. 1, first pump source 16 includes a CW pump element 24, used to provide the continuous wave optical pump input signal (operating at a wavelength of, for example 1420 nm). The CW output from element 24 is then applied as the optical input to a modulator 26 (which may comprise an electroabsorption modulator (EAM), or alternatively be an integral external modulator coupled directly to the pump element). The electrical signal input to modulator 26 comprises an RF signal, as supplied by an RF generator 28, where the RF signal is itself modulated with a predetermined, unique signature signal $S_1$. As shown in FIG. 1, the RF signal and signature signal $S_1$ are applied as separate inputs to a multiplier 30, where the output of multiplier 30 is used as the electrical input to modulator 26.

In accordance with the present invention, unique signature signal $S_1$ may comprise a low data rate (i.e., a few kilobytes/second) signal having a predetermined binary pattern. As long as the data rate is sufficiently low, the amplification process within fiber 14 will not be adversely affected. Moreover, the presence of the low data rate signal as modulating the pump input will allow for this data to pass through the transmission system and be recovered at the receiver without incurring any penalty on the input information signals (as was the case in the prior art arrangements).

In a similar fashion as described above, second pump source 20 comprises a pump element 32, modulator 34, RF signal generator 36, and a multiplier 38. In this case, a different signature signal, denoted $S_2$, is applied as an input to multiplier 38 with the RF signal, where this signature $S_2$ will then also be carried on the pump signal as it propagates along the transmission path. Since the amplification process occurs regardless of the propagation direction of the pump signal, second signature signal $S_2$ will also appear at the output of transmitter 10, and can thereafter be recovered in an optical receiver (such as shown in FIG. 2).

In accordance with the present invention, therefore, an optical receiver can be configured to monitor the received signals, filter out the pump signals and look for the presence of the signature signals. If one or both of the signature signals would not be present in the recovered pump signal, this would indicate that the pump is not working (or at least not operating at a sufficient power level). Since each signature signal is unique, this factor can be used to identify and isolate the defective pump source.

FIG. 2 illustrates an exemplary, simplified optical receiver arrangement 40 that can be used to recover the pump monitor signals (i.e., the signature signals) in accordance with the teachings of the present invention. As shown, the incoming amplified optical signals are first filtered in a low pass filter 42 to remove the remaining pump signal from the plurality of optical signals being transmitted. The recovered pump signal is then passed through a demodulator 44 to remove the impressed RF modulation signal, leaving only the signature signals. In the case where the signature signals comprise low data rate signals, an autocorrelation function can be used to identify each particular signature signal. Therefore, as long as each signature signal is present, it can be assumed that each pump source is operating properly. Various indicators may be used to analyze the recovered signature signals. For example, if one of the signal signature signals is absent, this is indicative of complete failure of the pump source (which can then be corrected by replacing one or more components in the failed pump source at transmitter). The SNR or BER of the recovered signature signal can be measured (when a signature signal is present), and used to determine the amount of power being emitted by the associated pump source. If the SNR is too low (i.e., too much noise on the transmitted signal) or the BER too high (i.e., too many errors in the transmitted signal), the input power level of the associated pump source can be increased until acceptable value for the SNR and/or BER is obtained.

Figure 3:
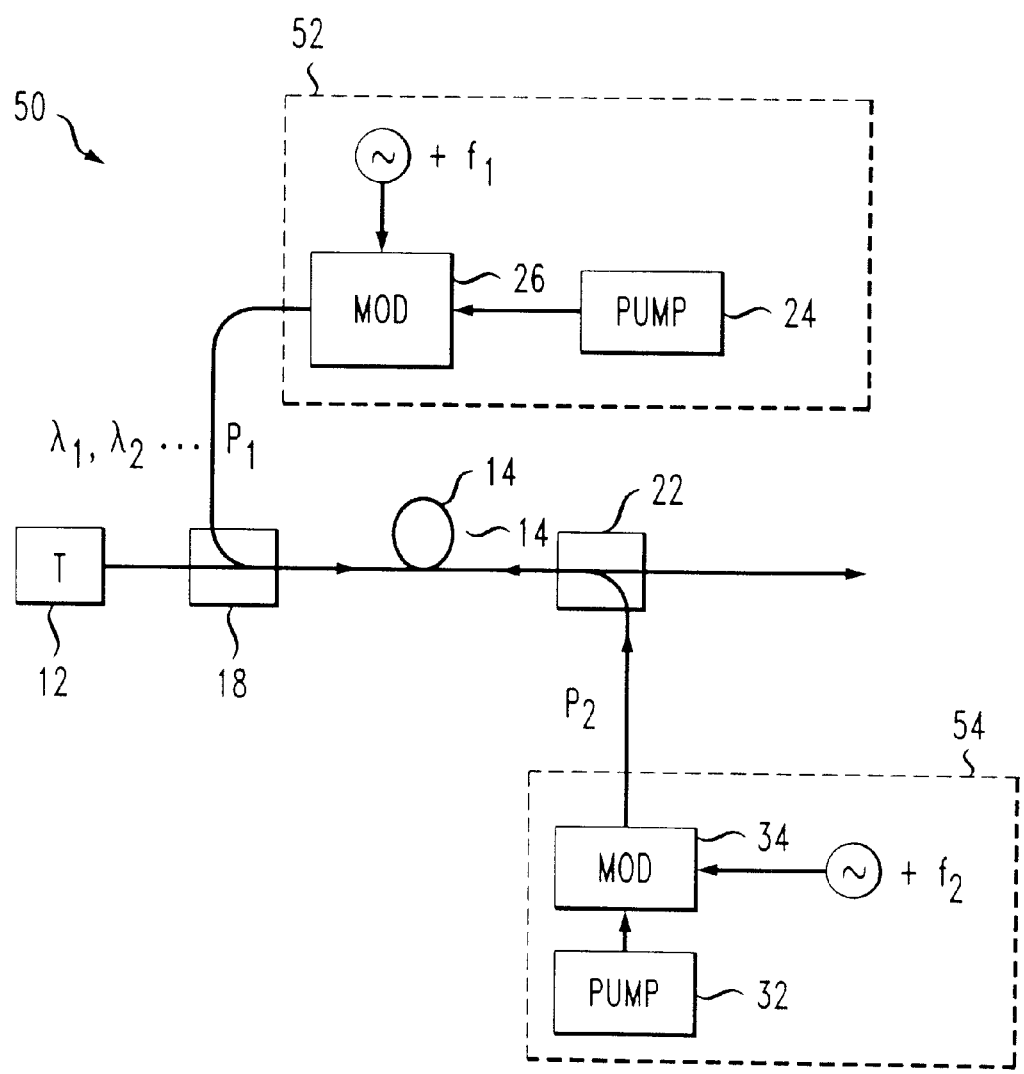
FIG. 3 illustrates an alternative optical transmitter formed in accordance with the present invention, utilizing different, unique frequency offsets with the RF pump modulation signal to provide the monitoring function of the present invention.

FIG. 3 illustrates an alternative transmitter 50 that can be used in accordance with the present invention. In this case, a unique frequency offset is imparted to each RF modulation signal applied to the CW pump signal to create an associated unique pump signature. In particular, and with reference to FIG. 3 (where like elements from the arrangement of FIG. 1 carry like reference numerals), a first pump source 52 comprises CW pump element 24 and modulator 26, as discussed above. The RF input is modified, in this case, to utilize an RF signal offset by a first predetermined frequency $f_1$. Similarly, a second pump source 54 comprises CW pump element 32 and modulator 34, where the RF modulation signal input is offset by a different frequency $f_2$. At the receiver (not shown), these frequency offsets can be recovered. As with the arrangement described above, various measures can be used to analyze the performance of the pump source (as well as its presence/absence), including but not limited to measurements of SNR and BER. Once a problem with a particular pump source has been identified, appropriate corrective measures may be taken at the transmitter (such as, for example, replacing one or more components in a pump unit, increasing the pump power, etc.

It is to be understood that the above-described embodiments are considered to be merely illustrative of the principles of the present invention. Numerous and various other arrangements can be made in accordance with these principles and are considered to fall within the spirit and scope of the invention as defined by the claims appended hereto.

What is claimed is:

1. An optical transmitter for amplifying a plurality of input signals operating over a predetermined wavelength range of $\lambda_1$–$\lambda_N$, the system comprising
   at least one optical pump source for supplying at least one RF-signature modulated Raman pump signal, said at least one optical pump source comprising
      an element for providing a continuous wave (CW) optical pump signal;
      a radio frequency (RF) electrical signal generator;
      a modulator; and
      a unique pump signature element, the unique pump signal element being used with the RF electrical signal output from the RF signal generator and applied as an electrical input to the modulator, wherein the CW optical pump signal is applied as an optical input to the modulator, the output of the modulator comprising the RF-signature-modulated Raman pump signal.

2. The optical transmitter as defined by claim 1 wherein the at least one optical pump signal comprises at least two pump sources, each utilizing a different pump signature signal.

3. The optical transmitter as defined in claim 1 wherein the at least two pump sources comprise a co-propagating pump source and a counter-propagating pump source, each utilizing a different pump signature signal.

4. The optical transmitter as defined in claim 1 wherein at least one unique pump signature element comprises a low data rate signal, each pump signature element utilizing a different, unique low data rate signal.

5. The optical transmitter as defined in claim 4 wherein the transmitter comprises a pair of pump sources, a first co-propagating pump source and a second counter-propagating pump source, the first pump source utilizing a first low data rate signal as its pump signature element and the second pump source utilizing a second low data rate signal as its pump signature element.

6. The optical transmitter as defined in claim 4 wherein each low data rate signature signal and the RF generator output are multiplied together to form the electrical input to each modulator.

7. The optical transmitter as defined in claim 1 wherein at least one unique pump signal element comprises a predetermined frequency offset applied to the output of the associated RF signal generator, forming a frequency offset RF modulation signal to apply as the electrical input to the modulator.

8. The optical transmitter as defined in claim 7 wherein the transmitter comprises a pair of pump sources, a first co-propagating pump source utilizing a first frequency offset for its associated RF modulation signal and a second counter-propagating pump source utilizing a second frequency offset for its associated RF modulation signal.

9. A pump source for providing an input amplifying signal for a Raman fiber amplifier and a control signal for monitoring the pump source performance, said pump source comprising an optical signal source of continuous wave (CW) pump light;

a modulator having an optical input and an electrical, modulating input, and an optical output, the optical output being representative of the optical input as modulated by the electrical, modulating input;

an RF generator for providing an RF electrical signal at a predetermined frequency and modulation depth; and a signature element, coupled to the RF generator, for creating a unique RF signal input for the external modulator, the signature element thereafter associated with the pump signal input to the fiber Raman amplifier for transmission and later collection at an optical receiver as a monitor signal for the pump source.

10. The pump source as defined in claim 9 wherein the signature element comprises a unique low data rate signal and a multiplier, the output of the RF generator and the low data rate signal applied as separate inputs to the multiplier and the multiplier output applied as the electrical, modulating input to the external modulator.

11. The pump source as defined in claim 9 wherein the signature element comprises a unique frequency offset applied to the output of the RF generator prior to being applied as the electrical, modulating input to the external modulator.

12. An optical communication system utilizing fiber Raman amplification for a plurality of N input optical signals operating over a predetermined wavelength range of $\lambda_1 - \lambda_N$ and providing monitoring and control of each pump source used in the communication system, the system including an optical transmitter comprising at least one optical pump source including an element for providing a continuous wave (CW) optical pump signal, a radio frequency (RF) electrical signal generator, a modulator and a unique pump signature element, the unique pump signature element being used with the RF signal output from the RF signal generator and applied as an optical input to the modulator, the output of the modulator then comprising an RF/signature-modulated Raman pump signal;

a transmission optical fiber coupled to both the at least one optical pump source and the source of the plurality of N input optical signals for providing amplification of the plurality of N input optical signals using the RF/signature-modulated Raman pump signal, the amplified signal carrying the signature associated with each pump element in the transmitter for later removal and monitoring; and an optical receiver coupled to the output end of the transmission optical fiber and comprising an optical filter for removing each RF/signature-modulated Raman pump signal from the plurality of received, amplified optical signals;

a demodulator for removing the RF modulator signal from the filtered Raman pump signal; and a detector for isolating each signature from the demodulated pump signal and determining the performance of each associated pump source based on the presence or absence of each signature.

13. The optical communication system as defined in claim 12 wherein each signature associated with a pump source comprises a unique low data rate signal such that the detector in the optical receiver can recover each separate low data rate signal and monitor the performance of each pump source.

14. The optical communication system as defined in claim 13 wherein the detector comprises an autocorrelation element that utilizes the known set of unique low data rate signals as an input with the recovered pump signal to determine the presence of absence of each low data rate signal.

15. The optical communication system as defined in claim 12 wherein each signature associated with a pump source comprises a different frequency offset applied to its associated RF modulation signal such that the detector in the optical receiver can recover each frequency offset and monitor the performance of each pump source.

16. The optical communication system as defined in claim 15 wherein the detector comprises a comb filter for removing each offset frequency to determine the presence or absence of each frequency offset pump source.

17. A method of applying a monitor and control signal to an optical signal passing through a fiber Raman amplifier between an optical transmitter and an optical receiver, the method comprising the steps of:

coupling a plurality of N input optical signals, operating over a predetermined wavelength range of $\lambda_1 - \lambda_N$, into a transmission fiber;

coupling at least one optical pump signal at a predetermined wavelength, modulated with an RF signal at a predetermined frequency and modulation depth and including a unique monitoring signal into the transmission fiber for amplifying the plurality of N input optical signals;

transmitting the plurality of N amplified signals along the transmission fiber to an optical receiver;

filtering the plurality of N received and amplified optical signals to remove the at least one optical pump signal; and detecting each unique monitoring signal present in the filtered pump signal to ascertain the performance of each pump source associated with each unique monitoring signal.

* * * * *